UNITED STATES PATENT OFFICE.

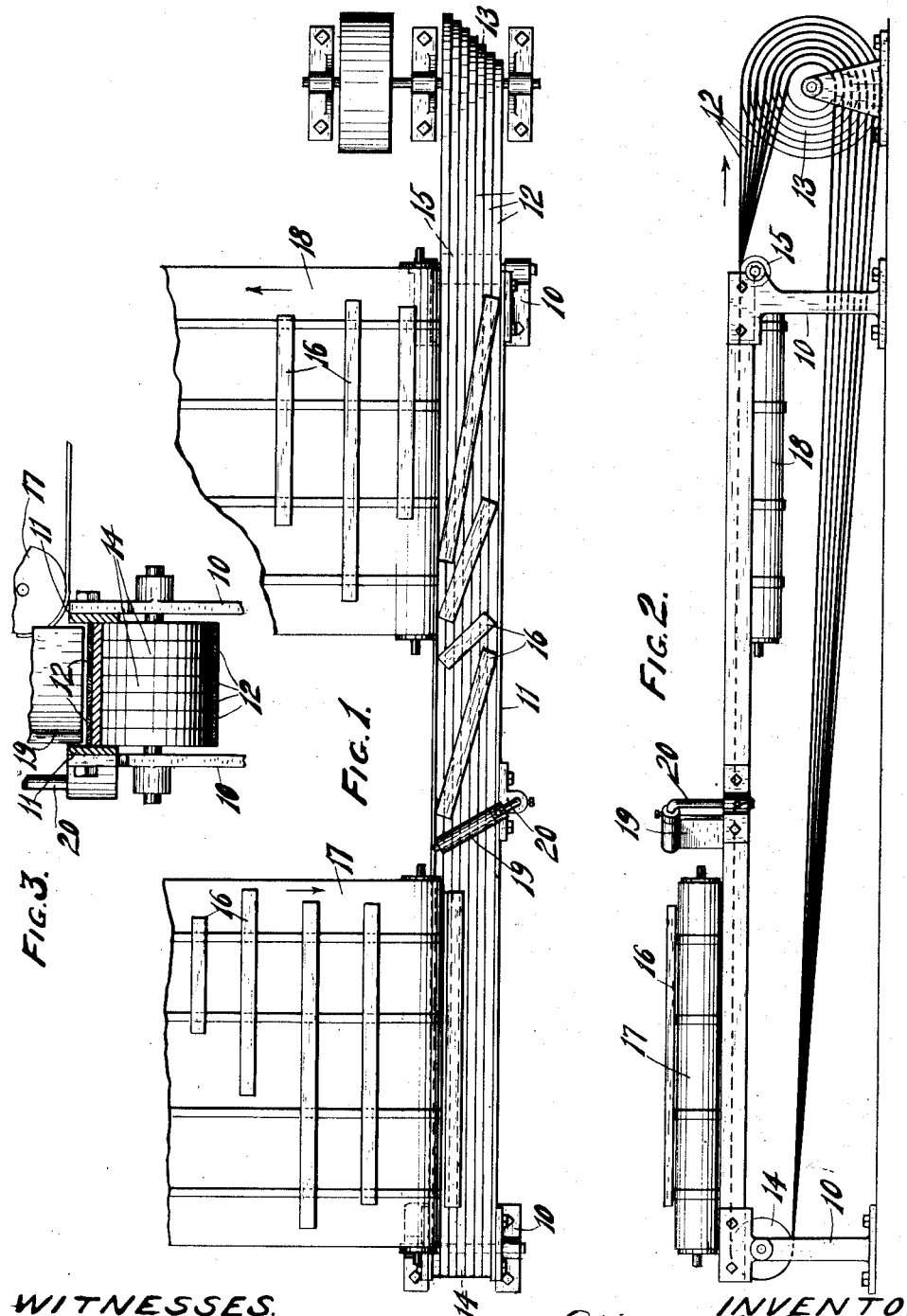

WILLIS S. SHERMAN, OF MILWAUKEE, WISCONSIN.

CONVEYER.

1,192,832. Specification of Letters Patent. Patented July 25, 1916.

Application filed July 11, 1910, Serial No. 571,498. Renewed January 7, 1916. Serial No. 70,887.

*To all whom it may concern:*

Be it known that I, WILLIS S. SHERMAN, a citizen of the United States of America, residing at Milwaukee, county of Milwaukee, State of Wisconsin, have invented new and useful Improvements in Conveyers, of which the following is a description, reference being had to the accompanying drawings, which are a part of this specification.

This invention has for its object to provide a conveyer for conducting strips of lumber or the like from one place to another, which will have one side thereof traveling faster than the other side so as to move the strips of lumber to an oblique position with relation to the direction of travel of the conveyer and thus cause the strips to overlap each other instead of lying end to end and permitting of more strips being fed to the destination in a given time than with a conveyer of ordinary construction.

With the above and other objects in view the invention consists in the conveyer as herein claimed, its parts and combinations of parts and all equivalents.

Referring to the accompanying drawings in which like characters of reference indicate the same parts in the different views: Figure 1 is a plan view of a conveyer constructed in accordance with this invention. Fig. 2 is a front elevation thereof: and, Fig. 3 is a transverse sectional view of the conveyer.

In these drawings 10 indicates a suitable frame structure, preferably in the form of a trough with upturned side walls 11 between which a series of narrow belts 12 are driven at different speeds, preferably by passing around a stepped pulley 13 which is driven from any suitable source of power. At the other end of their course of travel the belts 12 pass around a series of loose pulleys 14 on the end of the frame 10 and over similar idle pulleys 15 where they leave the conveyer trough 11. In this manner the belts are mounted to move in the same direction, but at different speeds, the speed increasing progressively from one side of the composite conveyer to the other. Strips of lumber 16 or other objects of a similar nature are fed to the conveyer at one end thereof, either by hand or by mechanical means, a conveyer apron 17 being shown in the drawings for the purpose, and such strips resting upon the moving belts 12 are carried along therewith to the other end of the conveyer where they are stopped by an operator or by other suitable means and are preferably removed by hand and fed to a machine, such as an end matching machine or any other desired mechanism, a conveyer apron 18 being shown in the drawings. If the conveyer consisted of a single belt, each strip would hold the succeeding strip back so that when the operator lifted a strip from the conveyer and placed it in the machine, indicated by the belt 18, he would have to wait until the conveyer moved the next strip a distance corresponding to the length of the removed strip before the succeeding strip would be in position to be fed by him to the machine, thus causing delay. With the series of belts 12 moving at progressively greater speeds from one side of the conveyer trough to the other, the faster moving belts have a tendency to draw the rear end of the strip toward the side wall 11 at that side of the trough, this tendency to turn the strip continuing until the strip bears against both side walls of the trough. It is the intension that the belts 12 shall be so narrow that a strip of material cannot rest entirely on any one of them, but must bear on at least two of them so as to be affected by their difference in speed, but in order that the strips may be quickly moved from a position lengthwise of the conveyer to a position oblique thereto, a swinging deflector 19 may be provided, as here shown pivotally mounted on a bracket frame 20 adjustably secured to the side of the trough to strike the front end of the strips as they pass beneath it and guide them toward the side of the conveyer where the belts move slower. The conveyer may be profitably employed without the use of the deflector, but in some cases it is thought that the deflector may assist in giving to the strips the desired oblique position with relation to the direction of movement of the conveyer and brush one strip off from another should they fall on the conveyer in such a condition.

By means of this invention the strips of flooring and other material of the same length or of different lengths are fed to a desired point successively without end abutment, each strip lying obliquely and the succeeding strips overlapping so that the strips may be fed to that point as rapidly as they are disposed of and no delay will be occasioned by the operator having to await the travel of a strip delayed by its engagement with the strip preceding it or by having one strip projecting in the path of removal of another strip.

Obviously the different speeds for the belts 12 may be produced by other means than the step cone pulley, but such pulley is suitable for the purpose. The conveyer is not limited to any particular number of belts, the principle involved being applicable where only two belts are employed, or where the slower belt is substituted by a stationary bearing surface.

I desire it to be understood that this invention is not limited to any specific form or arrangement of parts except in so far as such limitations are specified in the claims.

What I claim as new and desire to secure by Letters Patent is:

1. A conveyer, comprising a pair of belts side by side in the same plane, side walls positioned along the outer edges of the belts and extending above the plane thereof, one belt moving faster than the other for causing material carried by the conveyer to be moved to a position oblique to the line of travel of the conveyer and into contact with both side walls thereof.

2. A conveyer, comprising a suitably driven stepped pulley, a series of belts traveling around the successive steps of said pulley and thereby given different speeds of travel in the same direction, and idle pulleys for supporting the belts in approximately the same plane.

3. A conveyer, comprising a number of belts positioned side by side in the same plane, stationary side walls alongside of each of the outer belts and extending above the plane of the belts, said belts moving at different speeds, the belt speed being progressively faster from one side of the conveyer to the other for causing material carried thereby to be moved to a position oblique to the line of travel of the conveyer and into contact with both side walls of the conveyer.

4. In a conveyer, a traveling belt for conducting strips of material placed longitudinally thereon, and a swinging deflector suspended above the belt at an angle thereto to engage the front end of each strip and deflect it toward one side of the belt whereby the strips are given an oblique position on the belt.

In testimony whereof, I affix my signature, in presence of two witnesses.

WILLIS S. SHERMAN.

Witnesses:
R. S. C. CALDWELL,
LAURA A. KELLEY.